United States Patent
Cammenga et al.

(10) Patent No.: US 10,802,377 B2
(45) Date of Patent: *Oct. 13, 2020

(54) SWITCHABLE IMAGER LENS COVER

(71) Applicant: Gentex Corporation, Zeeland, MI (US)

(72) Inventors: David J. Cammenga, Zeeland, MI (US); Ethan J. Lee, Byron Center, MI (US)

(73) Assignee: GENTEX CORPORATION, Zeeland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,977

(22) Filed: Jul. 23, 2019

(65) Prior Publication Data
US 2019/0346741 A1    Nov. 14, 2019

Related U.S. Application Data

(63) Continuation of application No. 15/938,491, filed on Mar. 28, 2018, now Pat. No. 10,514,590.

(Continued)

(51) Int. Cl.
| | |
|---|---|
| *G03B 11/04* | (2006.01) |
| *B60R 11/04* | (2006.01) |
| *G02F 1/137* | (2006.01) |
| *G03B 9/00* | (2006.01) |
| *B60R 11/00* | (2006.01) |

(Continued)

(52) U.S. Cl.
CPC .......... *G03B 11/041* (2013.01); *B60R 11/04* (2013.01); *G02F 1/137* (2013.01); *G03B 9/00* (2013.01); *G03B 11/04* (2013.01); *B60R 2011/004* (2013.01); *B60R 2011/0045* (2013.01); *B60R 2011/0094* (2013.01); *G02F 2203/48* (2013.01); *G03B 17/00* (2013.01); *G03B 17/02* (2013.01); *G03B 17/04* (2013.01)

(58) Field of Classification Search
CPC ........ G03B 17/04; G03B 11/04; G03B 17/00; G03B 17/02; G03B 17/102
USPC ....................................... 396/448
See application file for complete search history.

(56) References Cited

U.S. PATENT DOCUMENTS

| | | |
|---|---|---|
| 3,659,307 A | 5/1972 | Vitou |
| 4,063,258 A | 12/1977 | Allen |

(Continued)

FOREIGN PATENT DOCUMENTS

| | | |
|---|---|---|
| EP | 1006486 A2 | 6/2000 |
| EP | 1227683 A1 | 7/2002 |

(Continued)

*Primary Examiner* — Clayton E. LaBalle
*Assistant Examiner* — Kevin C Butler
(74) *Attorney, Agent, or Firm* — Price Heneveld LLP; Bradley D. Johnson

(57) ABSTRACT

An optical module for a vehicle includes an imager configured to collect image data from at least one of inside and outside the vehicle. A cover is disposed proximate a lens of the imager. The cover includes an electro-optic cell aligned with the lens and configured to allow the imager to capture the image data through the cover. The cover is colored to match one of an interior and exterior body panel of the vehicle. The electro-optic cell is operable between a first condition wherein the electro-optic cell has a visible light transmission of greater than 50% and a second condition wherein the visible light transmission of the electro-optic cell is less than 15%.

20 Claims, 9 Drawing Sheets

Related U.S. Application Data

(60) Provisional application No. 62/479,030, filed on Mar. 30, 2017.

(51) Int. Cl.
  *G03B 17/00* (2006.01)
  *G03B 17/04* (2006.01)
  *G03B 17/02* (2006.01)

(56) References Cited

U.S. PATENT DOCUMENTS

| | | |
|---|---|---|
| 4,410,563 A | 10/1983 | Richter et al. |
| 4,621,785 A | 11/1986 | Embra |
| 4,699,478 A | 10/1987 | Tsui et al. |
| 4,736,218 A | 4/1988 | Kutman |
| 5,068,770 A | 11/1991 | Baziuk |
| 5,121,200 A | 6/1992 | Choi |
| 5,140,455 A * | 8/1992 | Varaprasad ............... C09K 9/02 359/275 |
| 5,315,333 A | 5/1994 | Nash |
| 5,418,567 A | 5/1995 | Boers et al. |
| 5,619,036 A | 4/1997 | Salvio et al. |
| 5,760,828 A | 6/1998 | Cortes |
| 5,761,556 A | 6/1998 | Ichino |
| 5,833,101 A | 11/1998 | Watkins |
| 5,910,854 A * | 6/1999 | Varaprasad ............... B32B 17/06 359/273 |
| 6,138,319 A | 10/2000 | Benoit |
| 6,333,759 B1 | 12/2001 | Mazzilli |
| 6,536,961 B1 | 3/2003 | Gillies |
| 6,580,373 B1 | 6/2003 | Ohashi |
| 6,607,606 B2 | 8/2003 | Bronson |
| 6,619,806 B2 * | 9/2003 | Akami ............... G02B 27/0006 359/513 |
| 6,731,867 B1 | 5/2004 | Sherwin |
| 6,911,997 B1 | 6/2005 | Okamoto et al. |
| 7,104,657 B2 | 9/2006 | Sherwin |
| 7,111,996 B2 | 9/2006 | Seger et al. |
| 7,245,207 B1 | 7/2007 | Dayan et al. |
| 7,255,451 B2 * | 8/2007 | McCabe ................ B60R 1/088 359/605 |
| 7,265,656 B2 | 9/2007 | McMahon et al. |
| 7,310,177 B2 * | 12/2007 | McCabe ................ F21S 43/14 359/265 |
| 7,355,629 B2 | 4/2008 | Lang et al. |
| 7,387,454 B2 * | 6/2008 | Kikuchi ................ G03B 17/02 396/439 |
| 7,448,812 B2 | 11/2008 | Heibel |
| 7,499,100 B2 | 3/2009 | Miyazaki et al. |
| 7,579,939 B2 * | 8/2009 | Schofield ................ B60Q 1/22 340/425.5 |
| 7,609,961 B2 | 10/2009 | Park |
| 7,630,624 B2 | 12/2009 | Chang |
| 7,813,639 B2 | 10/2010 | Yoneji |
| 7,881,496 B2 | 2/2011 | Camilleri et al. |
| 7,883,064 B2 | 2/2011 | Luft et al. |
| 7,891,886 B2 | 2/2011 | Schuetz |
| 7,965,336 B2 | 6/2011 | Bingle et al. |
| 8,031,224 B2 | 10/2011 | Linsenmaier et al. |
| 8,077,406 B2 * | 12/2011 | Hachitani ................ B60R 1/00 359/809 |
| 8,118,501 B2 | 2/2012 | Buschmann |
| 9,229,104 B2 | 1/2016 | Klar et al. |
| 9,838,653 B2 * | 12/2017 | Fish, Jr. ................ B60R 11/04 |
| 9,849,836 B2 * | 12/2017 | Minikey, Jr. ............ G06T 19/00 |
| 2005/0275738 A1 | 12/2005 | Arai |
| 2006/0171704 A1 * | 8/2006 | Bingle ................ B60R 11/04 396/419 |
| 2006/0238318 A1 * | 10/2006 | Brouwer ................ B60R 1/12 340/435 |
| 2006/0256459 A1 | 11/2006 | Izabel et al. |
| 2007/0132610 A1 * | 6/2007 | Guernalec ............... B60R 11/04 340/932.2 |
| 2007/0182817 A1 | 8/2007 | Briggance |
| 2007/0223899 A1 | 9/2007 | Snow |
| 2007/0236569 A1 | 10/2007 | Lin |
| 2008/0212189 A1 * | 9/2008 | Baur ................ B32B 17/10174 359/604 |
| 2009/0122141 A1 | 5/2009 | Nakamura et al. |
| 2009/0250533 A1 | 10/2009 | Akiyama et al. |
| 2010/0118145 A1 | 5/2010 | Betham et al. |
| 2010/0277379 A1 * | 11/2010 | Lindackers .......... H01Q 1/1207 343/713 |
| 2011/0033663 A1 | 2/2011 | Svec et al. |
| 2011/0037863 A1 | 2/2011 | Mihota et al. |
| 2011/0141281 A1 | 6/2011 | Barefoot et al. |
| 2011/0317298 A1 | 12/2011 | Van Stiphout |
| 2014/0111684 A1 | 4/2014 | Corbin et al. |
| 2014/0253731 A1 | 9/2014 | Suman et al. |
| 2016/0100084 A1 | 4/2016 | Schofield et al. |
| 2016/0191863 A1 * | 6/2016 | Minikey, Jr. .......... H04N 5/2252 348/148 |
| 2018/0091779 A1 | 3/2018 | Hendricks |

FOREIGN PATENT DOCUMENTS

| | | | |
|---|---|---|---|
| EP | 1529688 B1 | 2/2007 | |
| KR | 20080042418 A | 5/2008 | |
| KR | 100909368 B1 | 7/2009 | |
| KR | 101134305 B1 | 4/2012 | |
| KR | 101343814 B1 | 12/2013 | |
| KR | 20160133076 | * 11/2016 | ............... B60R 1/08 |
| KR | 20160133076 A | 11/2016 | |

* cited by examiner

SWITCHABLE IMAGER LENS COVER

CROSS-REFERENCE TO RELATED APPLICATION

This application is a continuation of U.S. application Ser. No. 15/938,491, filed on Mar. 28, 2018, now U.S. Pat. No. 10,514,590, entitled "SWITCHABLE IMAGER LENS COVER," which claims priority to and the benefit under 35 U.S.C. § 119(e) of U.S. Provisional Application No. 62/479,030, filed on Mar. 30, 2017, entitled "SWITCHABLE IMAGER LENS COVER," the disclosures of which are hereby incorporated herein by reference in their entirety.

TECHNOLOGICAL FIELD

The present invention generally relates to an imager lens cover, and more particularly, to a switchable imager lens cover.

SUMMARY OF THE DISCLOSURE

In one aspect of the present disclosure, an optical module for a vehicle includes an imager configured to collect image data from at least one of inside and outside the vehicle. A cover is disposed proximate a lens of the imager. The cover includes an electro-optic cell aligned with the lens and configured to allow the imager to capture the image data through the cover. The cover is colored to match one of an interior and exterior body panel of the vehicle. The electro-optic cell is operable between a first condition wherein the electro-optic cell has a visible light transmission of greater than 50% and a second condition wherein the visible light transmission of the electro-optic cell is less than 15%.

In another aspect of the present disclosure, a concealing assembly for a vehicle includes an optical module in electrical communication with the vehicle. A cover includes an electro-optic cell that is adjustable to match a color tone of a body panel of the vehicle. The cover includes at least one of a liquid crystal device, a suspended particle device, a variable light attenuation device, and a light scattering device. The cover is in optical communication with the optical module and is operable between a first condition wherein the electro-optic cell has a visible light transmission greater than 60% and a second condition wherein the visible light transmission of the electro-optic cell is less than 15%.

In yet another aspect of the present disclosure, a concealing assembly for a vehicle includes a cover disposed proximate an optical module. An electro-optic cell is operably coupled with the cover. A masking layer is disposed on a surface of the electro-optic cell. The electro-optic cell includes a first clear state condition configured to allow the optical module to capture image data through the electro-optic cell and a second dark state condition. The electro optic cell is operable to absorb at least 75% of visible light, thereby reducing visibility of the masking layer.

In still another aspect of the present disclosure, an imager module for a vehicle includes an imager having an imager lens. The imager is configured to collect image data from at least one of inside and outside the vehicle. A cover is disposed proximate the imager lens. The cover is configured to conceal the imager and includes a variable light attenuation device and a concealment device. The cover is operable between a first condition, wherein the imager is generally visible through the cover, and a second condition, wherein the imager is generally concealed from view through the cover.

In still yet another aspect of the present disclosure, an imager lens cover for a vehicle includes a cover disposed proximate an imager lens. The cover is configured to allow an imager to capture image data through the cover. The cover includes a light scattering device operable between a first condition, wherein the imager is generally visible through the cover, and a second condition, wherein the imager is generally concealed from view through the cover.

These and other features, advantages, and objects of the present invention will be further understood and appreciated by those skilled in the art by reference to the following specification, claims, and appended drawings.

DETAILED DESCRIPTION

Figure 1:
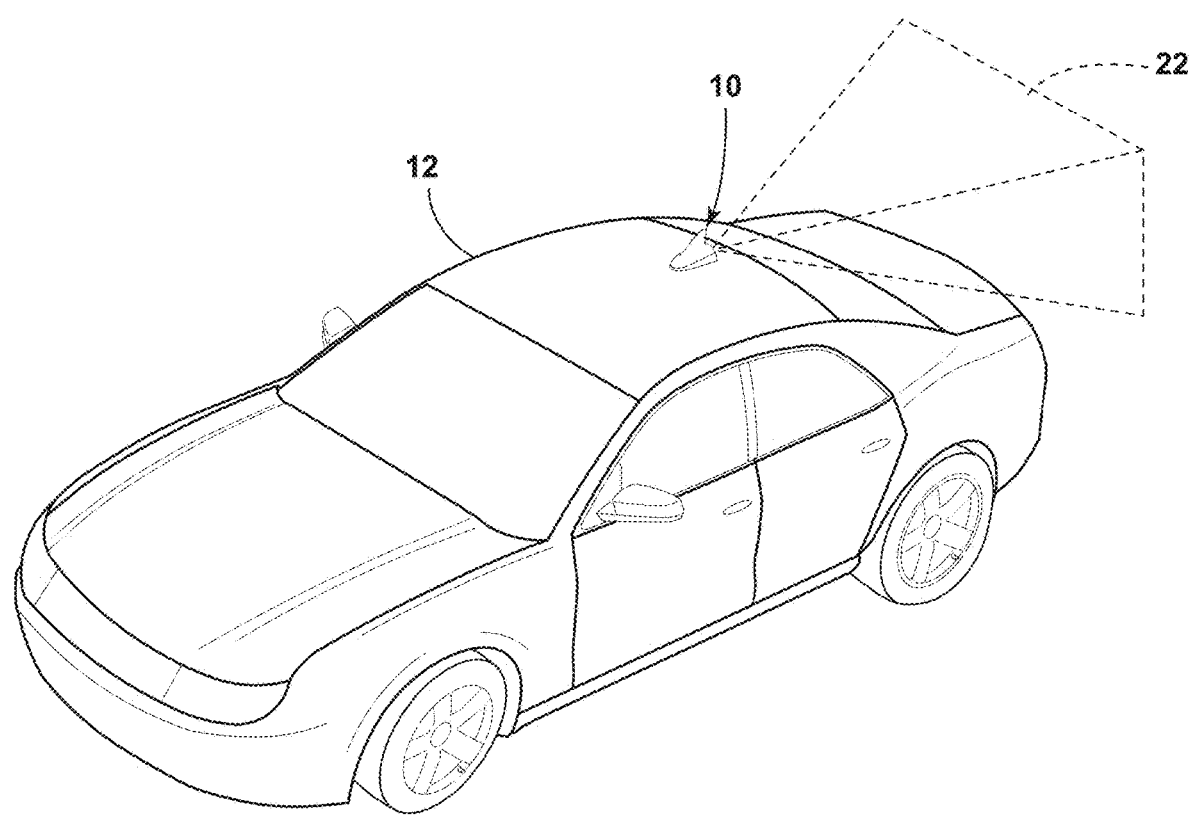
FIG. 1 is a top perspective view of one embodiment of a roof mounted antenna and imager module installed on a roof of a vehicle.
Figure 1A:
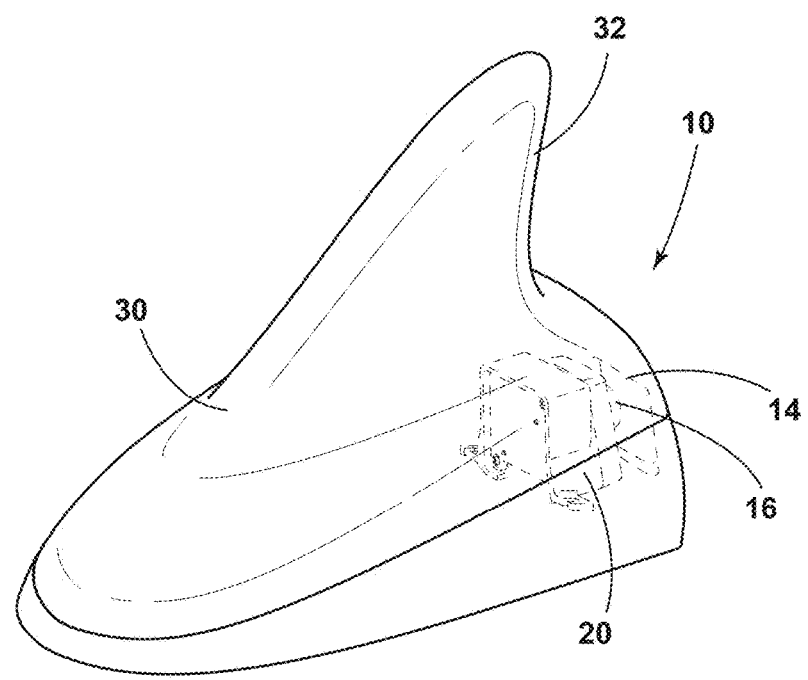
FIG. 1A is a front top perspective view of the roof mounted antenna and imager module of FIG. 1.

The present illustrated embodiments reside primarily in combinations of method steps and apparatus components related to a switchable imager lens cover. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the invention as oriented in FIG. 1. Unless stated otherwise, the term "front" shall refer to the surface of the device closer to an intended viewer of the device, and the term "rear" shall refer to the surface of the device further from the intended viewer of the device. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-10, the reference numeral 10 generally designates an imager lens cover for a vehicle 12 that includes a cover 14 disposed proximate an imager lens 16. The cover 14 is configured to allow an imager 20 to capture image data 22 through the cover 14. The cover 14 is operable between a first condition (FIG. 2), wherein the imager 20 is generally visible through the cover 14, and a second condition (FIG. 3), wherein the imager 20 is generally concealed from view by the cover 14.

The use of imagers (including cameras, sensors, etc.) on vehicles is becoming more widespread in an effort to increase safety and provide additional functionality on vehicles. Oftentimes, these imagers are not aesthetically pleasing to the consumer. Accordingly, ways to conceal the imagers, yet enable a full range of use for the imagers, is valuable. Vehicle manufacturers are utilizing more imagers than ever before in an effort to move the industry toward semiautonomous and fully autonomous vehicles. However, the appearance of the imagers, as noted above, can be unsightly. The concepts set forth herein address concealability issues.

In an effort to conceal imagers from view, mechanical systems are frequently used.

However mechanical systems frequently require moving parts, which, over time, results in wear and tear on static and moving parts of the system, resulting in failure of the mechanical system. An alternative is to utilize an electro-optic device in the cover 14 that extends over the imager lens 16.

Figure 2:
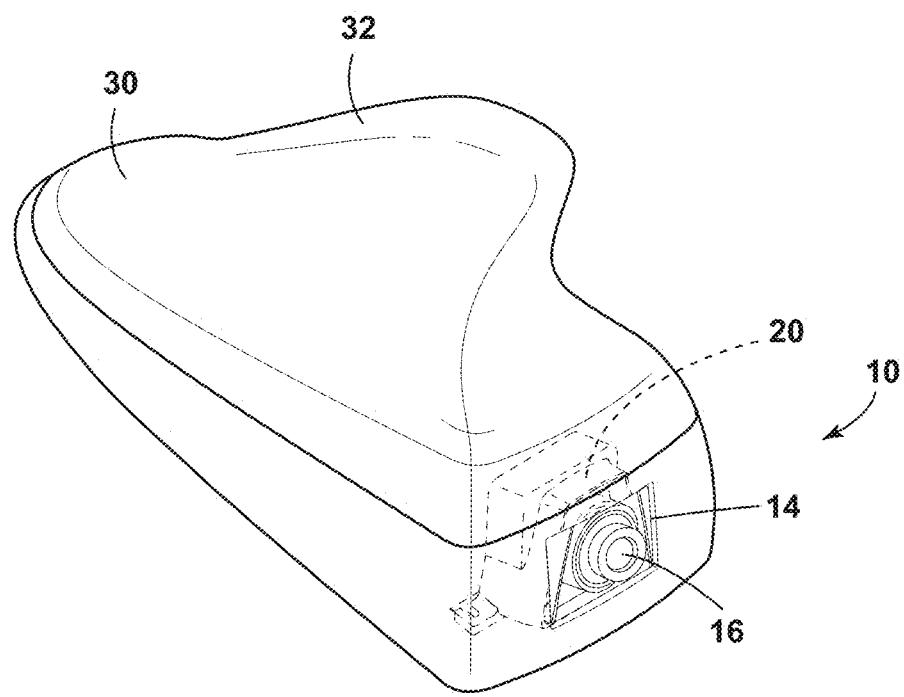
FIG. 2 is a rear top perspective view of the roof mounted antenna and imager module of FIG. 1.
Figure 3:
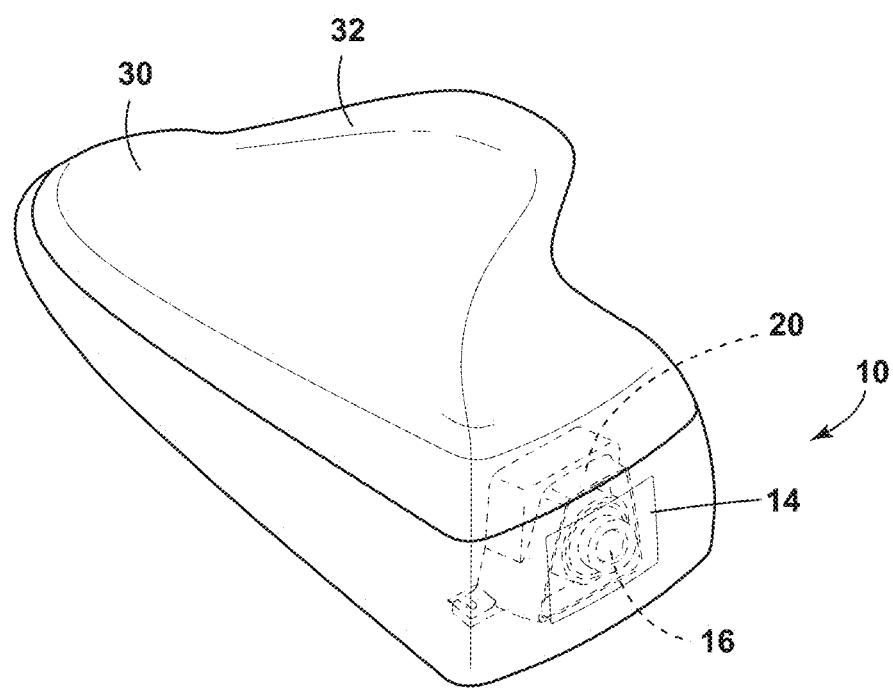
FIG. 3 is a rear top perspective view of the roof mounted antenna and imager module of FIG. 1 with the imager module hidden from view.
Figure 4:
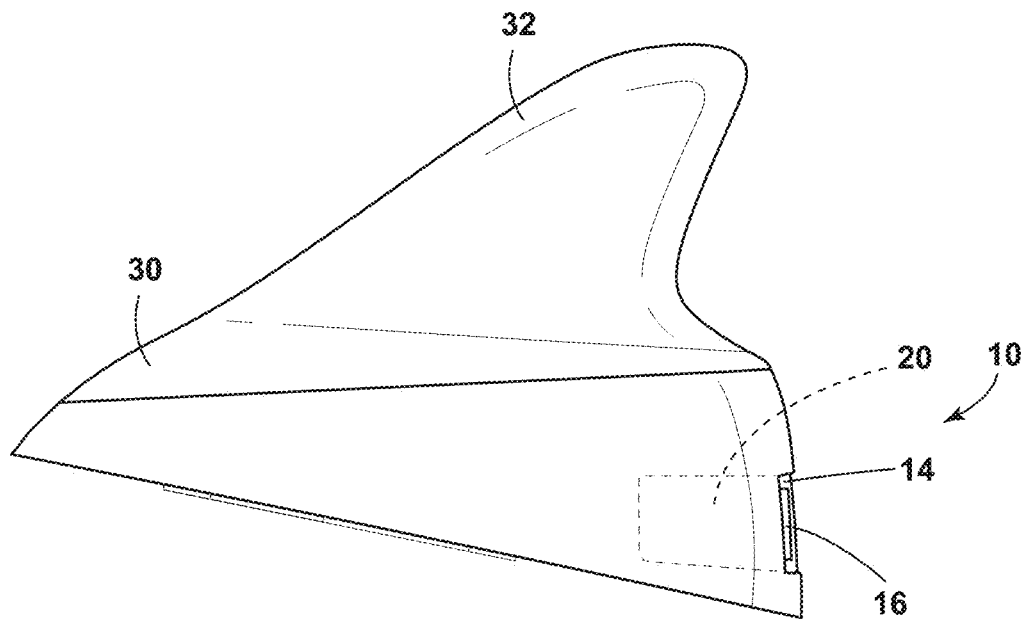
FIG. 4 is a side elevational view of the roof mounted antenna and imager module of FIG. 1.
Figure 5:
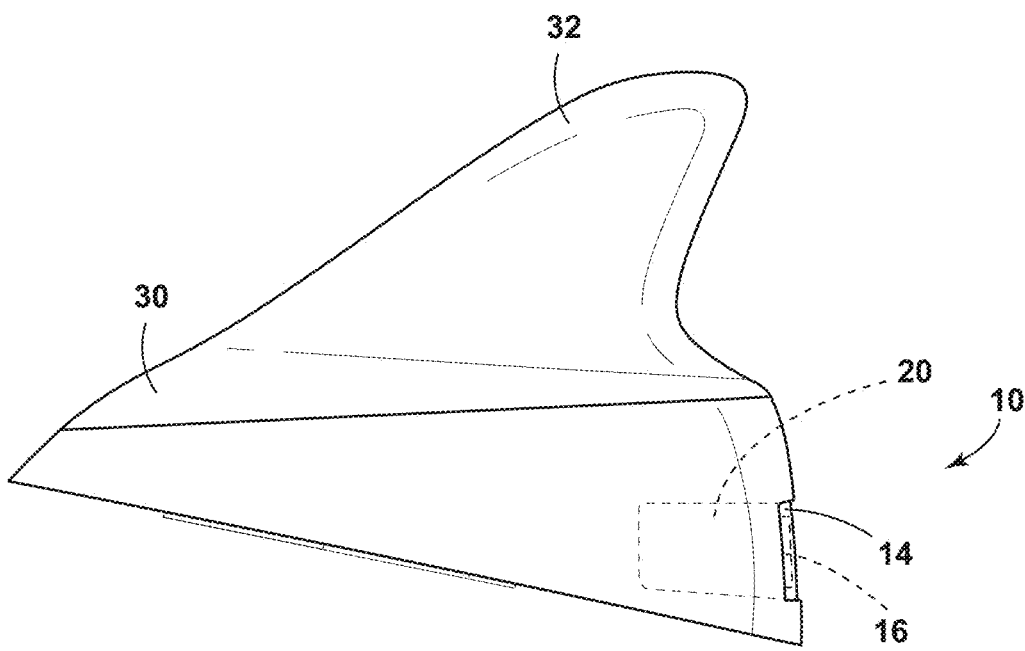
FIG. 5 is a side elevational view of the roof mounted antenna and imager module of FIG. 4 with the imager module hidden from view.
Figure 6:
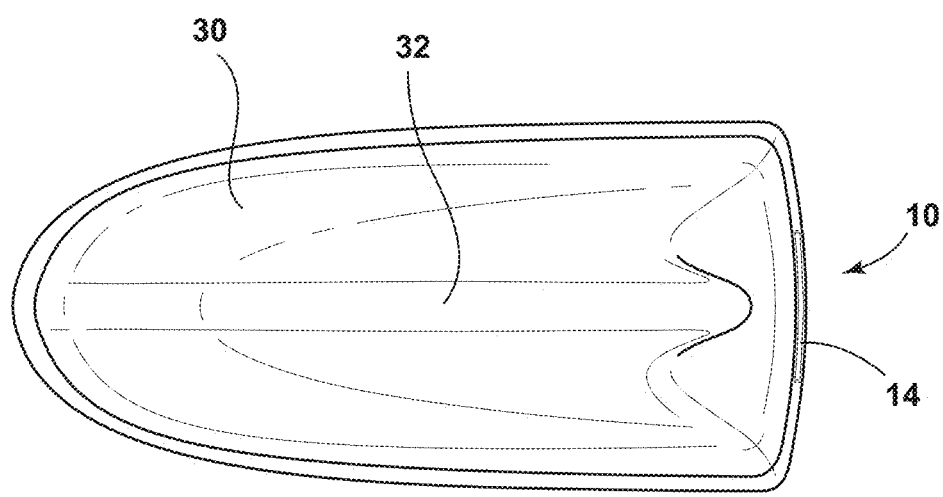
FIG. 6 is a top plan view of the roof mounted antenna and imager module of FIG. 1.

With reference now to FIGS. 1-6, the cover 14 may include electro-optic functionality which can absorb, reflect, and/or scatter light, thereby obscuring the visibility of the imager 20. The concealing cover 14 may be configured as part of a lens cover, or as part of a body panel. In one example, as shown in FIGS. 1 and 2, the cover 14 includes an electro-optic device that is positioned within a housing 30 of a vehicle antenna 32. In this instance, the cover 14 is disposed proximate the imager lens 16 and conceals the imager lens 16 from view outside of the vehicle 12. It is generally contemplated that the cover 14 may include a light absorbing, reflecting, and/or scattering liquid crystal device or electrochromic material. For example, the cover 14 may incorporate an electro-optic device in the form of an electrochromic device that absorbs light in the visible spectrum. Alternatively, the cover 14 may include a concealing device in the form of a light absorbing device, such as a suspended particle device, when activated (FIG. 3) and does not absorb light (FIG. 4) when deactivated.

In instances where a liquid crystal device is utilized, a liquid crystal cell can be positioned in or on the cover 14 proximate the imager lens 16. Some examples of dimming liquid crystal devices include reflective cholesteric liquid crystal devices, twisted-nematic liquid crystal devices (TN), and guest-host liquid crystal devices. A reflective cholesteric liquid crystal cell could be used to reflect light and prevent light from reaching the imager 20. In addition to reducing transmission of ambient light, the reflective properties of a reflective cholesteric liquid crystal device will also provide reflection of ambient light. This reflective property will improve the concealment of the imager 20 by increasing the system contrast. The liquid crystal cell can be used in combination with absorbing or reflecting polarizers. If the liquid crystal device includes two absorbing polarizers with a twisted nematic (TN) liquid crystal cell between the polarizers, the liquid crystal device may be used to block light going into or out of the imager 20 in one state, and will allow polarized light to pass through the cover 14 in the opposite state. As an example, the polarizer may be positioned in the cover 14 proximate a liquid crystal device and would have the same transmission orientation as with the polarizer positioned behind the liquid crystal cell. In this instance, the system would block light entering the cover 14 when the concealing device of the cover 14 was nonpowered. When the polarizers are positioned such that they will block both polarization orientations when there is no power, the imager 20 will be hidden behind the cover 14 (FIGS. 3 and 5) when the vehicle 12 is off and would not need to be powered to achieve concealment. The polarizers could be absorbing polarizers or reflective polarizers. If one or more reflective polarizers are used, the concealment device of the cover 14 would be somewhat reflective in the off state, and would help to hide the imager 20. In one example, the concealment device of the cover 14 may be a TN liquid crystal cell with at least one reflective polarizer with the concealment device tipped so that when observed, the concealment device appears to reflect a color that is consistent with the vehicle paint or a color of the surrounding surface on the vehicle 12. If the device is on a roof of the vehicle 12, a top of the concealment device of the cover 14 could be tipped down so a typical observer would be likely to perceive the concealment device of the cover 14 to have the same color tone as the color tone of the paint of the vehicle 12 roof (FIG. 1).

In some instances, the concealment device of the cover 14 with reflectance may result in double images or unwanted reflections within the structure. For the liquid crystal device using a TN liquid crystal cell, one configuration would be to put an absorbing polarizer near the imager 20 and a reflective polarizer on the opposite side of the liquid crystal cell. In this instance, the reflection from the reflective polarizer would not interfere with the image data 22 collected by the imager 20 since any light reflected back toward the imager 20 off of the reflective polarizer would be aligned with the absorbing axis of the absorbing polarizer.

In cases where a polarizer is positioned on the exterior portion of the cover 14, it may be advantageous to have an additional substrate laminated to the polarizer to protect it from mechanical abrasion and the environment. In one example, the additional substrate may contain UV-blocking material to protect the polarizer.

In another construction, it may be advantageous to put an electrochromic device or suspended particle device in the cover 14 proximate the imager lens 16 to provide light attenuation. The electrochromic device or suspended particle device may form part of the cover 14. For example, in bright sunlight, the imager 20 may reach a point of light saturation. A dimming device, such as an electrochromic device, could be used to reduce the overall light that reaches the imager 20. It is generally contemplated that the electrochromic device or suspended particle device may be able to be controlled over a wide range of transmission.

There are also a number of light scattering liquid crystal systems that may be used to obstruct the view of the imager 20. One such light scattering device may be based on a polymer dispersed liquid crystal (PDLC). It is also generally contemplated that a light scattering device such as a PDLC device and electrochromic device may be used in conjunction. The electrochromic device could be laminated to the liquid crystal device. Alternatively, the electrochromic device and the liquid crystal device could share a common substrate.

In any of the above examples, the use of an electrochromic device with memory will be particularly advantageous for imager concealment systems designed to conceal the imager 20 when the vehicle is parked. In one example, an electrochromic device may be utilized having a low end transmission of 10% and measuring at less than 12% after four hours, unpowered at open circuit. The same electrochromic device may have a high end transmission greater than 50%.

Figure 7:
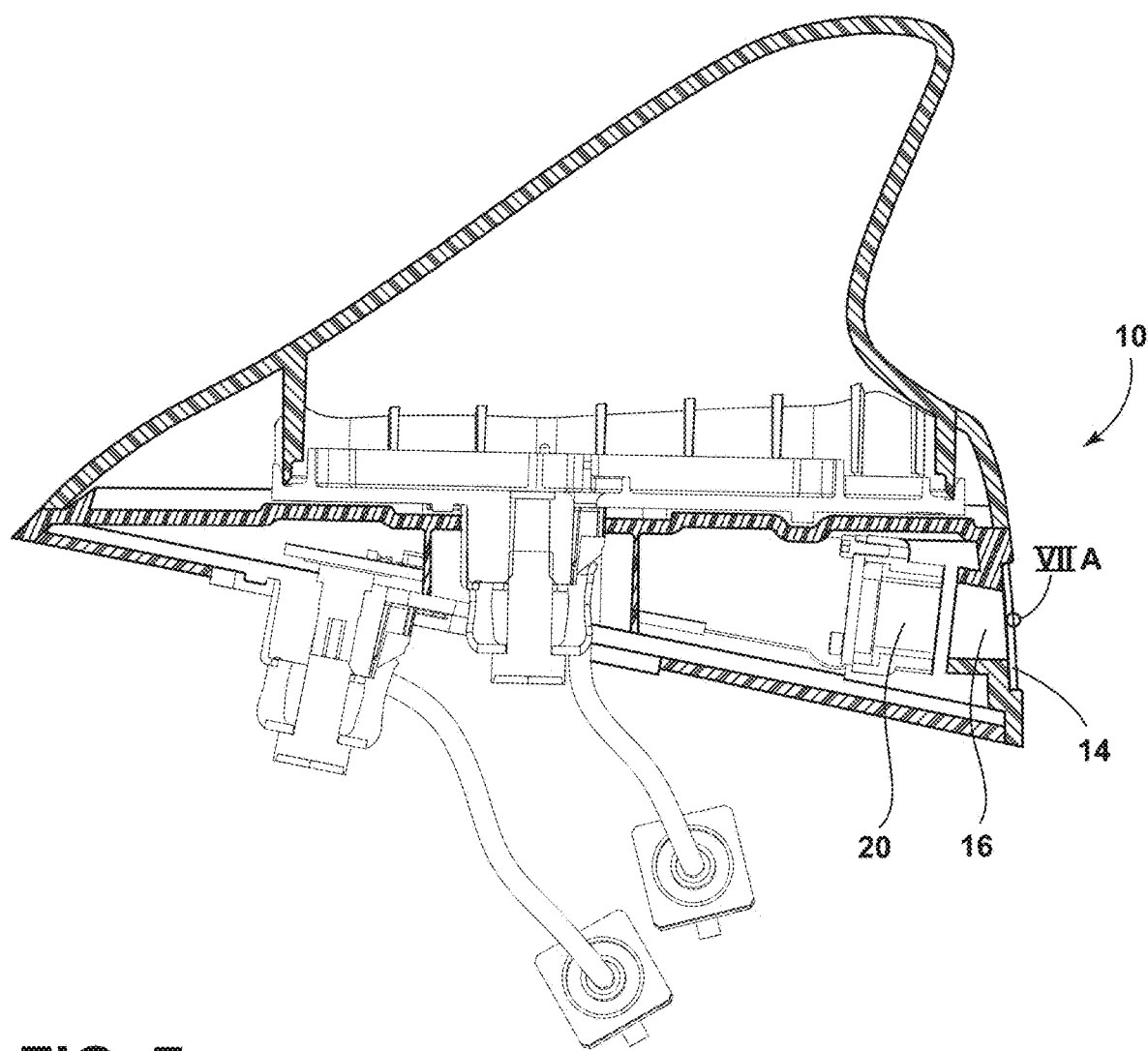
FIG. 7 is a side elevational cross-sectional view of the roof mounted antenna and imager module of FIG. 1 taken at line VII-VII.
Figure 7A:
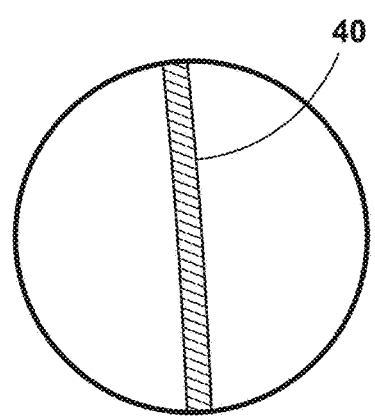
FIG. 7A is a side elevational view of a louvered film, as shown in area VIIA.

Additionally, as illustrated in FIGS. 7 and 7A, a louvered film 40 may also obscure the view of the imager 20 without darkening. The louvered film 40 may be positioned to obstruct the view from the anticipated viewing angle. That angle would vary depending on the position of the imager 20. In one example, the imager 20 may be positioned on top of the vehicle and would have a louver orientation to prevent viewing of the imager 20 from below. An imager positioned low on the vehicle (near a bumper, for example) may have a louver which conceals the imager 20 when viewed from above. Alternatively, a microdot ablation in an otherwise opaque coating proximate the imager lens 16 may allow enough light through for the imager 20 to function while still hiding the imager 20. If the opaque coating is a reflective coating, the imager 20 may be difficult to see during the day when ambient light would reflect off of the reflective surface. At night the imager 20 would remain hidden as the result of the partial light transmission of the coating in both directions.

Figure 8A:
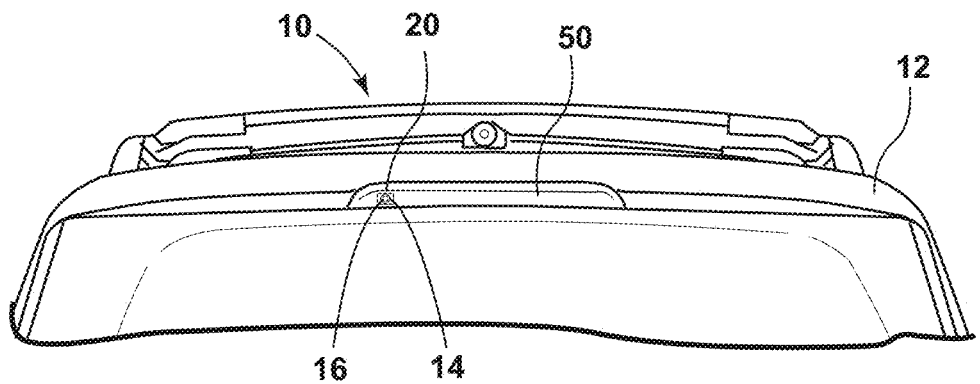
FIG. 8A is a front perspective view of a center high mount stop light of a vehicle having a cover disposed over an imager of the present disclosure.
Figure 8B:
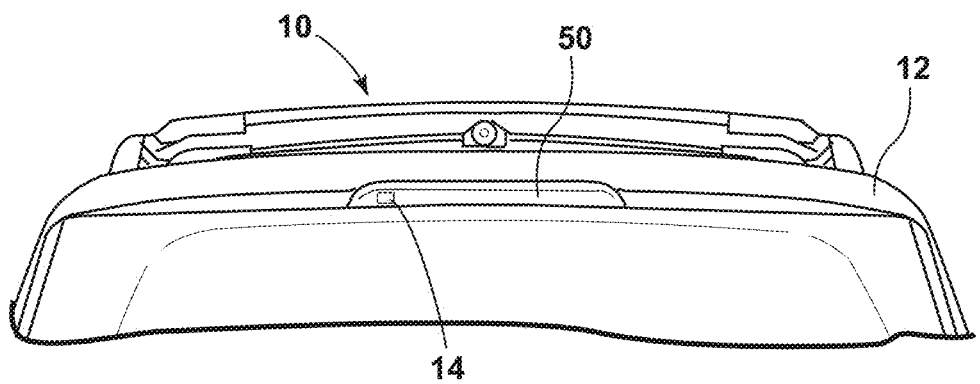
FIG. 8B is another front perspective view of the center high mount stop light of a vehicle having a cover disposed over an imager of the present disclosure.
Figure 8C:
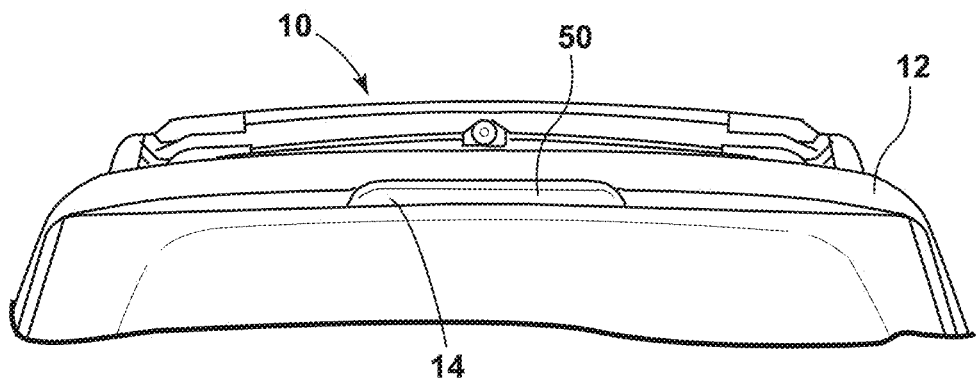
FIG. 8C is another front perspective view of the center high mount stop light of a vehicle having a cover disposed over an imager of the present disclosure.

With reference now to FIGS. 8A-8C, in the illustrated embodiment, a top portion of the vehicle 12 is illustrated having a center high mount stop light (CHMSL) 50. The imager 20 is disposed behind the cover 14 formed as part of the CHMSL 50. The imager 20 is configured to collect the image data 22 from behind the vehicle 12. The cover 14 may be configured to conceal the imager lens 16 by darkening (via any of the manners disclosed above), such that the imager lens 16 is not visible from outside of the vehicle 12.

In the darkened state, the cover 14 will appear as a dark square on the body panel or CHMSL 50 of the vehicle 12. Alternatively, as shown in FIG. 8C, using other manners as set forth above, including a reflective polarizer, for instance, the cover 14 can be configured to appear to have a color tone that matches or nearly matches the color tone of the paint of the body panel or CHMSL 50 of the vehicle 12.

Figure 9A:
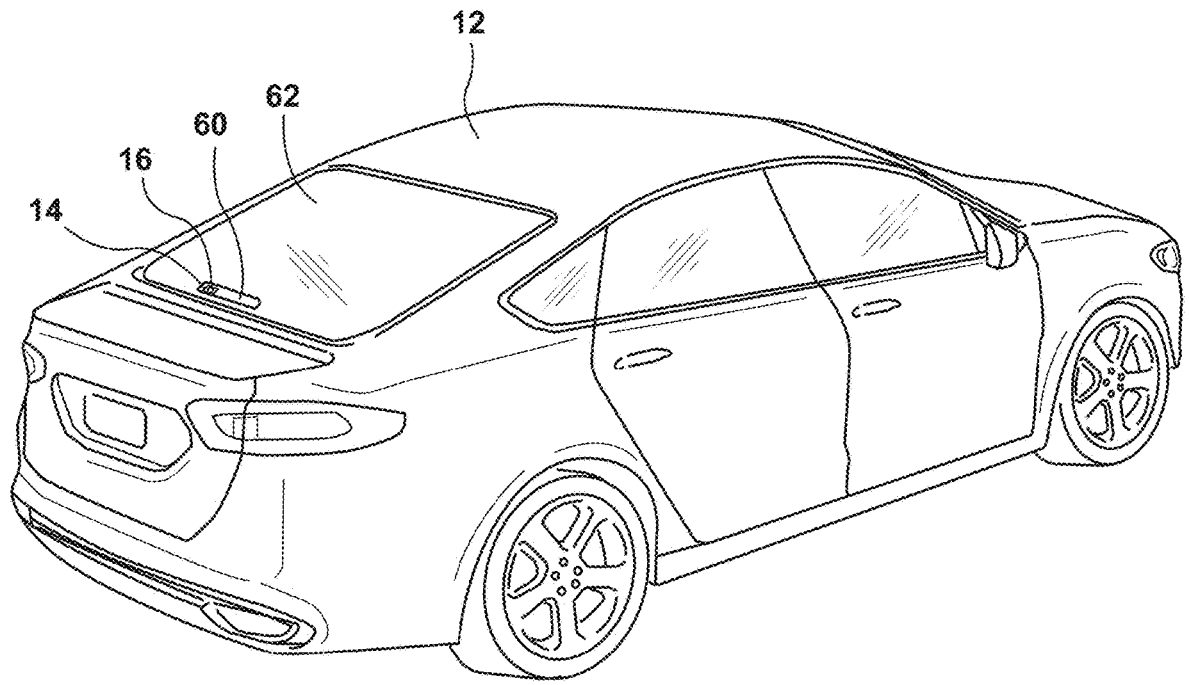
FIG. 9A is a rear elevational view of a vehicle with a brake light including a cover extending over an imager module.
Figure 9B:
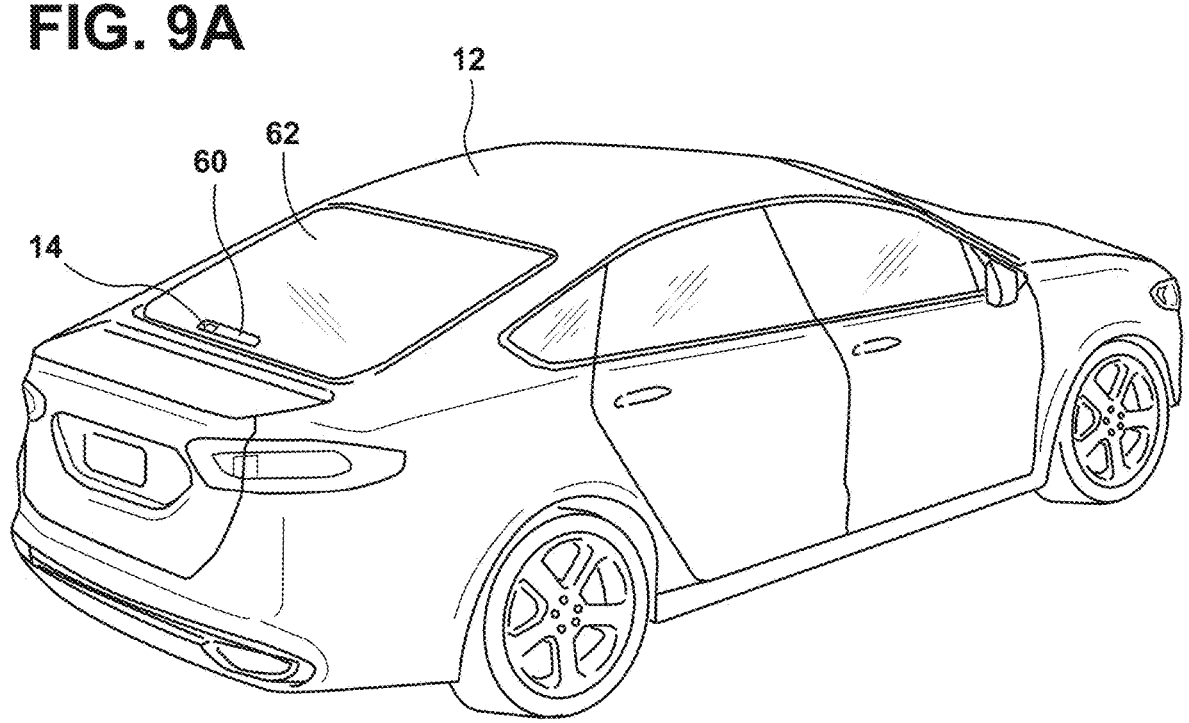
FIG. 9B is a rear elevational view of a vehicle with a brake light including a cover extending over an imager module.
Figure 9C:
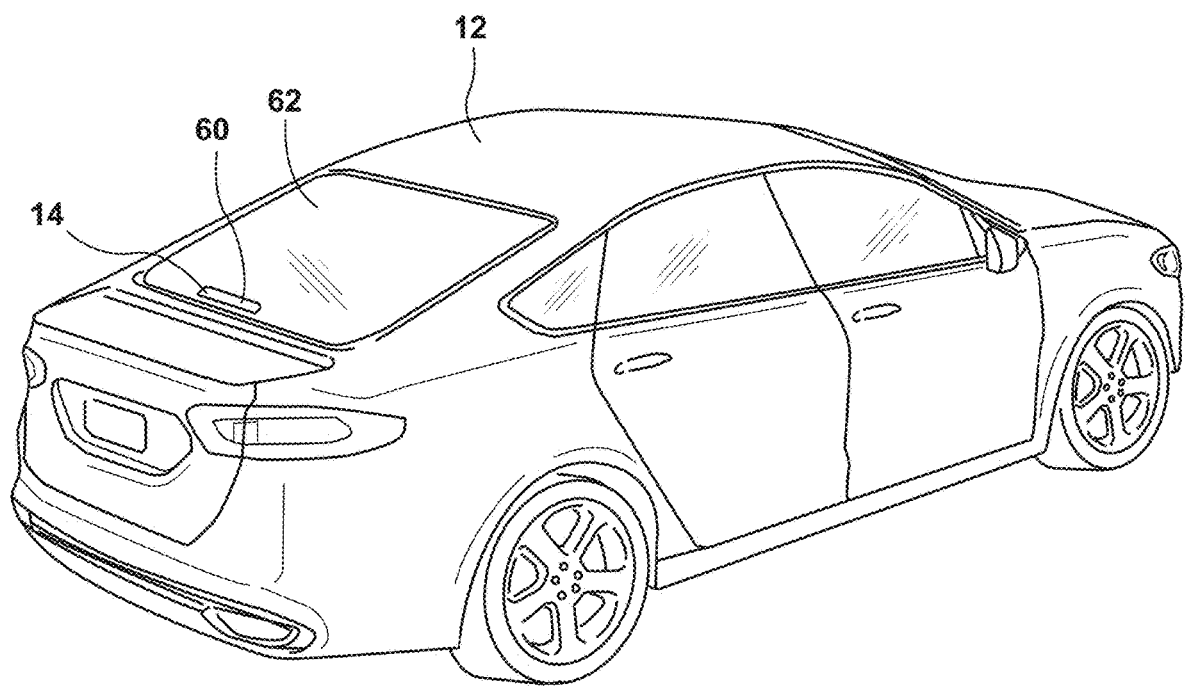
FIG. 9C is another rear elevational view of a vehicle with a brake light including a cover extending over an imager module.

In a similar fashion, as shown in FIGS. 9A-9C, the imager 20 can also be used in or on a brake light 60 of the vehicle 12. In this instance, the imager 20 collects the image data 22 through a rear windshield 62 of the vehicle 12. In an undarkened are deactivated state, the imager 20 may be visible, as shown in FIG. 9A. However, upon activation of the concealment device, which may be any of those set forth above, the imager lens 16 may be hidden from view by the cover 14, which may appear as a darkened area on the brake light 60. Alternatively, as shown in FIG. 9C, the darkened state may be configured to match closely with the hue or general color of the brake light 60, such that no imager 20 is generally observable, nor is the cover 14 readily discernible relative to its surroundings.

Figure 10:
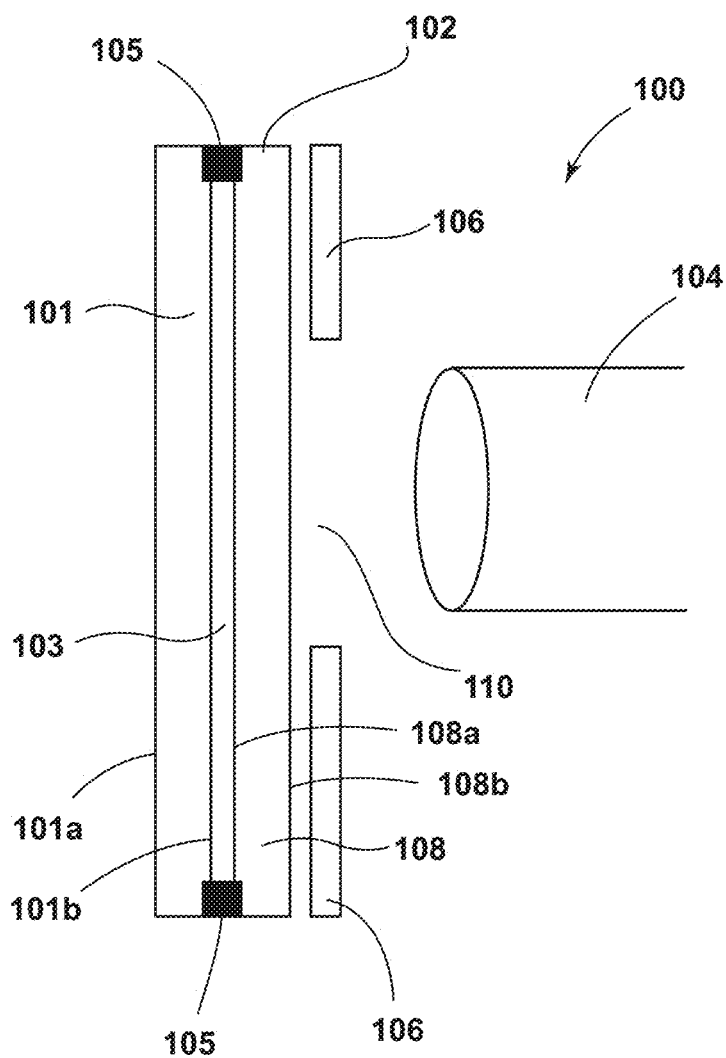
FIG. 10 is a side schematic view of a concealing assembly of the present disclosure in the form of a lens cover.

With reference now to FIG. 10, one example of a concealing assembly 100 in the form of an imager lens cover that includes an electro-optic cell 102 is illustrated. The electro-optic cell 102 may include an electro-optic material 103, such as an electrochromic medium, for concealing an imager 104. The electro-optic cell 102 may include a front substrate 101 defining a first surface 101a and a second surface 101b. The electro-optic cell 102 also includes a rear substrate 108 defining a third surface 108a and a fourth surface 108b. Seals 105 are disposed between the front substrate 101 and the rear substrate 108. The electro-optic material 103 is sealed between the seals 105 and the front and rear substrates 101, 108. The concealing assembly 100 includes a masking layer 106 on the fourth surface 108b of the electro-optic cell 102. The masking layer 106 defines an aperture 110 for the imager 104 and blocks viewing of other portions of the imager 104 or imager housing when the electro-optic cell 102 is in a clear state. When the electro-optic cell 102 is clear, the imager 104 can view through the aperture 110. When the electro-optic cell 102 is fully darkened, the electro-optic material 103 absorbs at least 75 percent, at least 80 percent, or at least 90 percent of the visible light and substantially reduces the visibility of the masking layer 106 or the imager 104.

In one example, the transmission level of the electro-optic cell 102 can be varied from the clear state of greater than 60 percent visible light transmission to less than one percent transmission in the low transmission state. In the fully low transmission state, the total light reflecting off of the concealing assembly 100 is generally considered color neutral. The C* (chroma) of the concealing assembly 100 is less than 15 in the low transmission state, and may be less than 10 (when measured in the L*C*h color space). If the concealing assembly 100 has C* greater than 15, the hue may have a value of h between about 210 degrees and 280 degrees. In this range of hue, the color will appear generally blue while avoiding more pronounced and typically more objectionable green or red colors. Even when C* is less than 15 or less than 10, it is contemplated that h may be between 210 degrees and 280 degrees. In one embodiment, the visible light transmission in the high transmission state is 63 percent and the low transmission state has 0.5 percent transmission with a C* of 7.6. However, it will be understood that the low end transmission range may extend from 15 percent to less than one percent.

A continuous range of dimming between the clear state and the fully darkened state are possible, and may be used to make adjustments to the amount of visible light reaching the imager 104. In some situations, it may be advantageous to dim the electro-optic cell 102 when the ambient conditions are very bright.

For vehicle use, the concealing assembly 100 may be reflecting, absorbing, or scattering visible light to conceal the imager 104 when the vehicle 12 is parked. Concealing assemblies 100 that draw current in the darkened state could, over time, drain the battery of the vehicle 12. There are a number of systems that can maintain low specular transmission with little or no power. Many liquid crystal configurations can maintain a darkened condition when in the off state. Some electrochromic systems and suspended particle devices can also maintain low transmission in the darkened state. A concealing assembly 100 with less than 5 mW of power consumption in the low transmissive state may be acceptable. Power consumption less than 3 mW, 2 mW, or 1 mW may also be utilized.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An optical module for a vehicle comprising:
   an imager configured to collect image data from at least one of inside and outside said vehicle; and
   a cover disposed proximate a lens of the imager, the cover including an electro-optic cell aligned with the lens and configured to allow the imager to capture the image data through the cover, wherein the cover is colored to match one of an interior and exterior body panel of said vehicle, and wherein the electro-optic cell is operable between:
      a first condition wherein the electro-optic cell has a visible light transmission of greater than 50%; and
      a second condition wherein the visible light transmission of the electro-optic cell is less than 15%.

2. The optical module of claim 1, wherein the electro-optic cell has a power consumption of less than 5 mW when in the second condition.

3. The optical module of claim 1, wherein the visible light transmission of the electro-optic cell is less than 10% in the second condition.

4. The optical module of claim 1, wherein the electro-optic cell includes a front substrate, a rear substrate, and an electro-optic material disposed therebetween.

5. The optical module of claim 1, wherein the cover is disposed adjacent to a window of said vehicle.

6. The optical module of claim 1, wherein the cover is integrally formed as part of one of the interior or exterior body panel of said vehicle.

7. The optical module of claim 1, wherein the cover defines at least a portion of a housing of a vehicle antenna.

8. The optical module of claim 1, wherein the cover includes a suspended particle device.

9. A concealing assembly for a vehicle, said concealing assembly comprising:
   an optical module in electrical communication with said vehicle;
   a cover including an electro-optic cell that is adjustable to match a color tone of a body panel of said vehicle, wherein the cover includes at least one of a liquid crystal device, suspended particle device, variable light attenuation device, and light scattering device, the cover being in optical communication with the optical module and operable between:
      a first condition wherein the electro-optic cell has a visible light transmission greater than 60%; and
      a second condition wherein the visible light transmission of the electro-optic cell is less than 15%.

10. The concealing assembly of claim 9, wherein the cover is disposed adjacent to a window of said vehicle.

11. The concealing assembly of claim 9, wherein the cover is integrally formed as part of the body panel of said vehicle.

12. The concealing assembly of claim 9, wherein the cover defines at least a portion of a housing of a vehicle antenna.

13. The concealing assembly of claim 9, wherein the electro-optic cell has a power consumption of less than 5 MW when in the second condition.

14. A concealing assembly for a vehicle comprising:
a cover disposed proximate an optical module;
an electro-optic cell operably coupled with the cover; and
a masking layer on a surface of the electro-optic cell, wherein the electro-optic cell includes a first clear state condition configured to allow the optical module to capture image data through the electro-optic cell and a second dark state condition, and wherein the electro-optic cell is operable to absorb at least 75% of visible light, thereby reducing visibility of the masking layer.

15. The concealing assembly of claim 14, wherein the electro-optic cell includes a front substrate and a rear substrate, and wherein an electro-optic material is disposed therebetween.

16. The concealing assembly of claim 14, wherein the electro-optic cell includes at least one of a suspended particle device, liquid crystal device, variable light attenuation device, and light scattering device.

17. The concealing assembly of claim 14, wherein the electro-optic cell has a power consumption of less than 5 MW when in the second dark state condition.

18. The concealing assembly of claim 14, wherein the cover is disposed adjacent to a window of said vehicle.

19. The concealing assembly of claim 14, wherein the cover is integrally formed as part of a body panel of said vehicle.

20. The concealing assembly of claim 14, wherein the cover defines at least a portion of a housing of a vehicle antenna.

* * * * *